(12) United States Patent
Kupke et al.

(10) Patent No.: US 7,836,108 B1
(45) Date of Patent: Nov. 16, 2010

(54) CLUSTERING BY PREVIOUS REPRESENTATIVE

(75) Inventors: Joachim Kupke, San Jose, CA (US); David Michael Proudfoot, Mountain View, CA (US)

(73) Assignee: Google Inc., Mountain View, CA (US)

( * ) Notice: Subject to any disclaimer, the term of this patent is extended or adjusted under 35 U.S.C. 154(b) by 438 days.

(21) Appl. No.: 12/059,628

(22) Filed: Mar. 31, 2008

(51) Int. Cl.
*G06F 17/30* (2006.01)
*G06F 12/00* (2006.01)

(52) U.S. Cl. .................................... 707/826
(58) Field of Classification Search ................ 707/826, 707/999, 104.1
See application file for complete search history.

(56) References Cited

U.S. PATENT DOCUMENTS 7,680,773 B1 * 3/2010 Acharya et al. ............ 707/737
7,725,465 B2 * 5/2010 Liao et al. ................. 707/728

* cited by examiner

*Primary Examiner*—Kuen S Lu
(74) *Attorney, Agent, or Firm*—Harrity & Harrity, LLP

(57) ABSTRACT

A method may include identifying documents in a current clustering operation, assigning the identified documents to one or more clusters, selecting a current representative document for each of the one or more clusters, determining whether the current representative document has been re-crawled, determining a previous representative document with which the current representative document was previously associated in a prior clustering operation, if it is determined that the current representative document has not been re-crawled, determining one of the one or more clusters to which the previous representative document has been assigned in the current clustering operation, combining one of the one or more clusters associated with the current representative document that has not been re-crawled with the one of the one or more clusters associated with the previous representative document into a combined cluster, and storing information regarding the combined cluster.

21 Claims, 13 Drawing Sheets

FIG. 9C

INDEXING TABLE 905

| DOCUMENT 910 | KEY VALUE 915 | RE-CRAWLED 920 | REP 925 | RE-CRAWLED 930 | KEY VALUE 935 |
|---|---|---|---|---|---|
| A1 | 3 | YES | A1 | YES | 6 |
| A2 | 3 | YES | A1 | NO | 3 |
| A3 | 3 | YES | A1 | YES | 6 |
| A4 | 5 | YES | A4 | YES | 4 |
| A5 | 5 | YES | A4 | NO | 5 |
| A6 | 5 | YES | A4 | NO | 5 |

PREVIOUS DECISIONS | CURRENT DECISIONS

INDEXING TABLE 905

| DOCUMENT 910 | KEY VALUE 915 | RE-CRAWLED 920 | REP 925 | RE-CRAWLED 930 | KEY VALUE 935 | REP 940 |
|---|---|---|---|---|---|---|
| A1 | 3 | YES | A1 | YES | 6 | A1 |
| A2 | 3 | YES | A1 | NO | 3 | A2 |
| A3 | 3 | YES | A1 | YES | 6 | A1 |
| A4 | 5 | YES | A4 | YES | 4 | A4 |
| A5 | 5 | YES | A4 | NO | 5 | A5 |
| A6 | 5 | YES | A4 | NO | 5 | A5 |

PREVIOUS DECISIONS — CURRENT DECISIONS

FIG. 9D

| INDEXING TABLE 905 | | | | | | |
|---|---|---|---|---|---|---|
| DOCUMENT 910 | KEY VALUE 915 | RE-CRAWLED 920 | REP 925 | RE-CRAWLED 930 | KEY VALUE 935 | REP 940 |
| A1 | 3 | YES | A1 | YES | 6 | A1 |
| A2 | 3 | YES | A1 | NO | 6 | A1 |
| A3 | 3 | YES | A1 | YES | 6 | A1 |
| A4 | 5 | YES | A4 | YES | 4 | A4 |
| A5 | 5 | YES | A4 | NO | 4 | A4 |
| A6 | 5 | YES | A4 | NO | 4 | A4 |

PREVIOUS DECISIONS / CURRENT DECISIONS

FIG. 9E

CLUSTERING BY PREVIOUS REPRESENTATIVE

BACKGROUND

Crawler-based search engines may employ various algorithms to identify documents on the World Wide Web ("web") relevant to search terms contained in a user's query. Typically, a crawler-based search engine will include a crawler, an indexer and a search engine. The crawler is a software tool that searches the web for content (e.g., documents). The crawler may be provided with a seed list of addresses (e.g., Uniform Resource Locators (URLs) or some other form of Uniform Resource Identifier (URI)) to visit based on one or more search criteria. The crawler may visit a document corresponding to an address in the seed list and/or reference a robots.txt file (e.g., on a web site) that provides the crawler with a list of documents that are inaccessible. As the crawler spiders a document, the crawler may, among other things, extract outgoing links to other documents (e.g., hyperlinks) that are associated with the visited document. These outgoing links or addresses may be added to the seed list. The process of visiting documents may be repeated until the crawler decides to stop. The crawler may periodically return to these addresses so that if changes have been made to these documents, the indexer may be updated.

The indexer may create an index of the documents crawled by the crawler. For example, the indexer may catalog and maintain a copy of every document that the crawler discovers and/or a location of or a pointer to the document (e.g., a URL). The search engine may sort through the information in the indexer and present the user with the most relevant results in a particular order (e.g., a descending order of relevance).

A problem that the indexer confronts is how to handle duplicate content on the web. For example, the same document may appear duplicated or substantially duplicated in different forms or at different places (e.g., different URLs) on the web. Accordingly, it is undesirable for the indexer to index duplicate documents because it may lead to search results that would be undesirable to the user since the user does not want to be presented with multiple documents in a search result that contain the same, or substantially the same, content. Further, indexing duplicate documents wastes resources (e.g., memory, processing, etc.).

Given a set of duplicate documents, an indexer may select one of these documents to index. However, determining which of the duplicate documents to index can be difficult. Additionally, given the volume of documents that an indexer may be processing, differences in freshness among the documents exists. For example, while the crawler may re-visit documents to determine if changes have been made, the crawler may not re-visit all of the documents at the same time and/or with the same frequency.

SUMMARY

According to one aspect, an automated method may include identifying documents in a current clustering operation, assigning the identified documents to one or more clusters, selecting a current representative document for each of the one or more clusters, determining whether the current representative document has been re-crawled, determining a previous representative document with which the current representative document was previously associated in a prior clustering operation, if it is determined that the current representative document has not been re-crawled, determining one of the one or more clusters to which the previous representative document has been assigned in the current clustering operation, combining one of the one or more clusters associated with the current representative document that has not been re-crawled with the one of the one or more clusters associated with the previous representative document into a combined cluster, and storing information regarding the combined cluster.

According to another aspect, a system may include at least one memory and at least one processor. The at least one processor may be connected to the at least one memory to store re-crawl information indicating which document of a plurality of documents has been re-crawled, assign the documents to one or more clusters in a current clustering operation, select a current representative document for each of the one or more clusters, determine whether the current representative document has been re-crawled based on the re-crawl information, determine a previous representative document associated with the current representative document, if it is determined that the current representative document has not been re-crawled, combine together one of the one or more clusters associated with the current representative document that has not been re-crawled and one of the one or more clusters to which the previous representative document has been assigned in the current clustering operation, and store information related to each of the one or more clusters.

According to yet another aspect, a system may include at least one computer-readable medium containing computer-executable instructions, the at least one computer-readable medium may include one or more instructions for clustering documents into one or more clusters in a current clustering process, one or more instructions for selecting a representative for each of the one or more clusters, one or more instructions for determining if the representative has been re-crawled since a prior clustering process, one or more instructions for determining a previous representative associated with the representative in the prior clustering process, if it is determined that the representative has not been re-crawled, one or more instructions for forming a combined cluster that includes a one of the one or more clusters associated with the representative that has not been re-crawled and a one of the one or more clusters to which the previous representative has been assigned in the current clustering process, and one or more instructions for storing information related to the combined cluster.

According to still another aspect, a system may include means for clustering documents into one or more clusters in a current clustering operation, means for assigning a measure of quality to each of the documents of the one or more clusters, means for selecting a current representative document for each of the one or more clusters based on the measure of quality, means for determining whether the current representative document has been re-crawled, means for determining a previous representative document associated with the current representative document, if it is determined that the current representative document has not been re-crawled, means for assigning one of the one or more clusters that includes the current representative document that has not been re-crawled to a same cluster of the one or more clusters to which the previous representative document has been assigned in the current clustering operation, and means for storing information related to the one or more clusters.

According to another aspect, a method may include identifying documents in a current clustering operation, assigned the identified documents to one or more clusters, determining whether each of the identified documents has been re-crawled since a prior clustering operation, determining, for one of the identified documents that has not been re-crawled, a representative document with which the one identified document was previously associated in the prior clustering operation, determining one of the one or more clusters to which the representative document has been assigned in the current clustering operation, assigning the one identified document that has not been re-crawled to the one of the one or more clusters to which the representative document has been assigned, and storing information regarding the one of the one or more clusters to which the one identified document is assigned.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 9A-9E are diagrams illustrating exemplary index information.

DETAILED DESCRIPTION

Figure 1A:
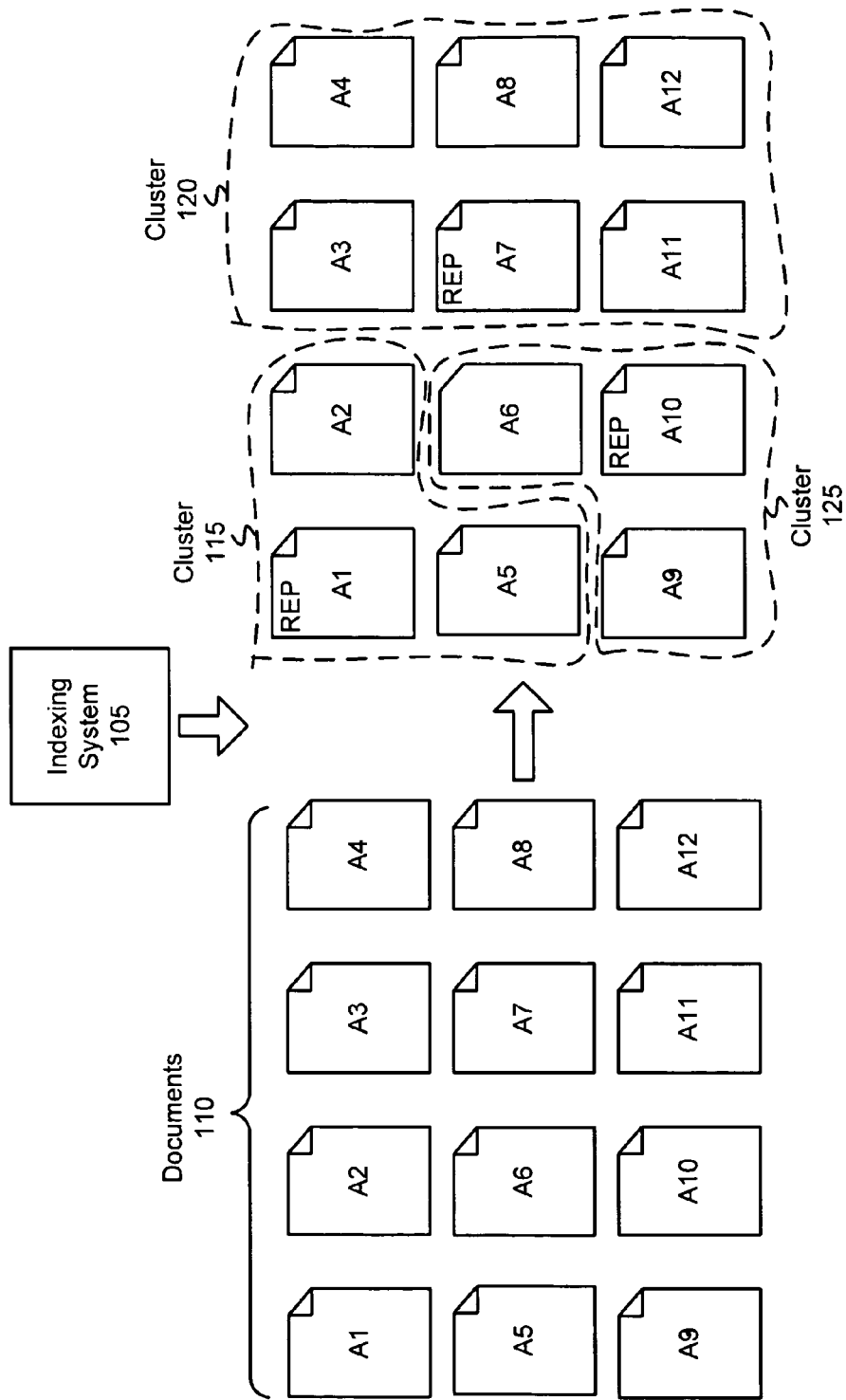
FIGS. 1A and 1B are diagrams illustrating concepts described herein.

The following detailed description of the invention refers to the accompanying drawings. The same reference numbers in different drawings may identify the same or similar elements. Also, the following detailed description does not limit the invention.

OVERVIEW

In the description to follow, reference will be made to a "document" or "documents" and a "web site" or "web sites." A "document," as the term is used herein, is to be broadly interpreted to include any machine-readable and machine-storable work product. A document may include, for example, an e-mail, a file, a combination of files, one or more files with embedded links to other files, a news group posting, a blog, a business listing, an electronic version of printed text, a web advertisement, an image, a database record, a dynamically generated document, etc. In the context of the Internet, a common form of a "document" is a web page. Web pages often include textual information and may include embedded information (e.g., metadata, images, or hyperlinks) and/or embedded instructions (e.g., JavaScript).

Additionally, in the description to follow, reference will be made to a "web site." A "web site," as the term is used herein, is to be broadly interpreted to include a collection of related documents, such as documents associated with a same host, domain, or organization. For example, a collection of related documents may include all or a subset of all of the documents associated with a traditional web site, directory, or sub-directory, or some other collection or set of documents that are related to each other (e.g., on the same host or associated with the same domain or organization).

Additionally, in the description to follow, reference will be made to "quality information." "Quality information," as the term is used herein, is to be broadly interpreted to include any information associated with a document. For example, quality information may include link information. A "link," as the term is used herein, is to be broadly interpreted to include any reference to/from a document from/to another document or another part of the same document. Additionally, or alternatively, quality information may include, for example, a date a document is created, a page (or document) rank, anchor text information, an aesthetic of address information (e.g., a short and/or a word-based URL may have a higher aesthetic value than a long and/or a non-word based URL containing, for example, symbols, such as ?, !, ~, *, etc.), popularity information, source of content information (e.g., quality of a web site, age of a web site), and/or other kinds of information that may indicate whether a document may be a representative.

In the context of indexing, the presence of duplicate documents (i.e., documents with the same or substantially the same content) may lead to wasting resources (e.g., processing, storage, and/or network resources) and degrading a user's search experience. One technique described herein may select one duplicate document, as representative of a cluster of duplicative documents, to index. This representative document (also referred to as a canonical) may then be indexed and/or served as a part of the search results.

Implementations described herein may identify differences in crawl times among documents and reconcile these differences to minimize duplicative documents. FIG. 1A is a diagram illustrating this concept. As illustrated, a collection of documents 110 may be produced for an indexing system 105. During a clustering process, documents 110 may be clustered and a representative document may be selected for each cluster. For example, documents (A1, A2, and A5) may be grouped together in cluster 115, with document (A1) being selected as the representative (as illustrated by a "REP"); documents (A3, A4, A7, A8, A11, and A12) may be grouped together in cluster 120, with document (A7) being selected as the representative; and documents (A6, A9, and A10) may grouped together in cluster 125, with document (A10) being selected as the representative.

Figure 1B:
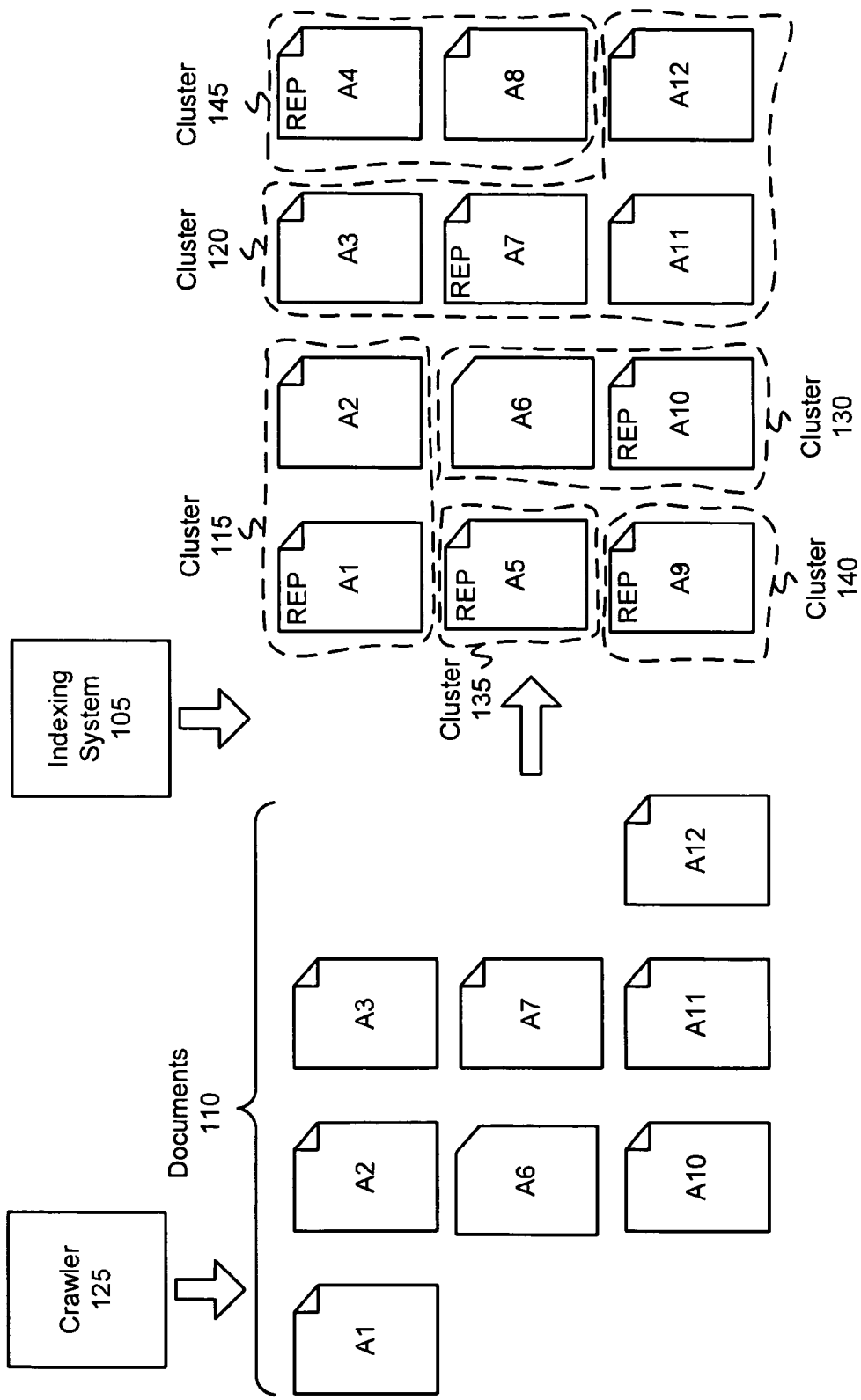

As illustrated in FIG. 1B, a crawler 125 may re-visit only a subset of documents 110 during a period between a prior clustering process and a current clustering process. That is, for example, crawler 110 may have re-crawled documents (A1, A2, A3, A6, A7, A10, A11, and A12), but may not have re-crawled documents (A4, A5, A8, and A9). In this instance, however, the clustering process may re-cluster all of documents 110. For example, documents (A1 and A2) may be clustered together in cluster 115, with document (A1) being selected as the representative; documents (A3, A7, A11, and A12) may be clustered together in cluster 120, with document (A7) being selected as the representative; and documents (A6 and A10) may be clustered together in cluster 130, with document A10 being selected as the representative.

Additionally, the subset of documents 110 that were not re-crawled (i.e., documents (A4, A5, A8, and A9)) may form new clusters because the subset of documents 110 that were re-crawled may have changed content. For example, document (A5) may form cluster 135, with document (A5) being selected as the representative; document (A9) may form cluster 140, with document (A9) being selected as the representative; and documents (A4 and A8) may form cluster 144, with document (A4) being selected as the representative.

One approach for addressing the additional clusters (i.e., clusters 135, 140, and 145) is to determine the respective previous representatives associated with the representatives of clusters 135, 140, and 145. That is, the clustering process may determine what previous representative was associated with the representative when, for example, the clustering process was previously run. By applying this rule, documents that have not been re-crawled may not form additional clusters. Rather, each of these documents may remain with a cluster previously determined based on a remembrance of the representative's previous representative. For example, the representative of cluster 135 is document (A5), and its previous representative was document (A1). Accordingly, even though document (A5) may not have been re-crawled, as illustrated in FIG. 1B, document (A5) would not form an additional cluster, but instead may be clustered with document (A1). Similarly, document (A9) may be clustered together with its previous representative (document (A10)), and document (A4) may be clustered together with its previous representative (document (A7)). Document (A8) may be clustered together with document (A4)'s previous representative (document (A7)).

Since the concepts described herein have been broadly described with respect to FIGS. 1A and 1B, it is to be understood that variations exist and will be described below. As a result of the foregoing, the introduction of duplicative documents may be minimized by eliminating the forming of additional clusters stemming from documents that have not been re-crawled since a prior clustering process.

Exemplary Environment

Figure 2:
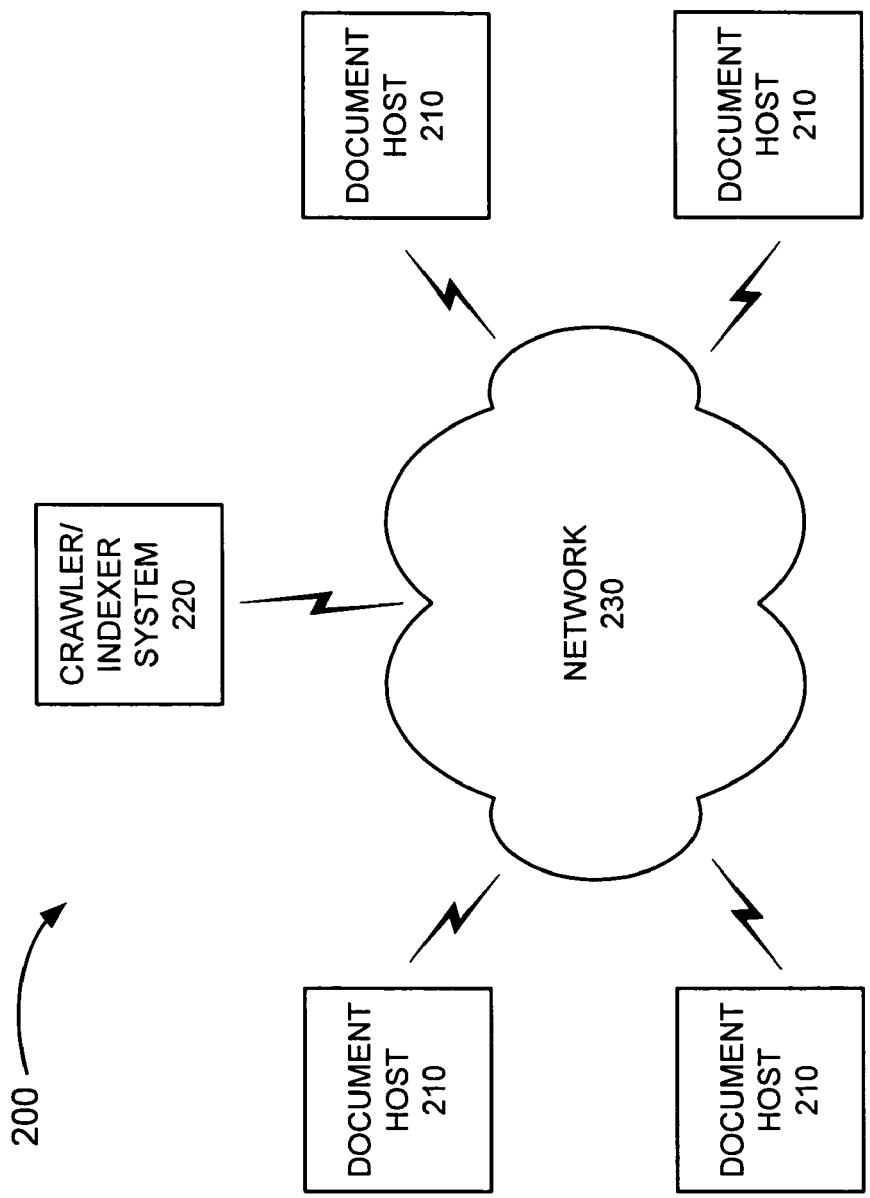
FIG. 2 is a diagram illustrating an exemplary network in which systems and methods described herein may be implemented.

FIG. 2 is a diagram illustrating an exemplary environment 200 in which systems and methods described herein may be implemented. As illustrated, environment 200 may include multiple document hosts 210 connected to a crawler/indexer system 220 via a network 230. In practice, the number of document hosts 210, crawler/indexer system 220, and/or network 230 may be different, as well as the arrangement. Further, one or more of document hosts 210 and crawler indexer system 220 may be the same device.

Document hosts 210 may include entities that store and/or manage documents. An entity may be defined, for example, as a device (e.g., a computer, a personal digital assistant (PDA), a telephone, etc.), a process running on a device (e.g., a program, a thread, a fiber), and/or an object executable by a device.

Crawler/indexer system 220 may include an entity that crawls, processes, indexes and/or maintains documents. For example, crawler/indexer system 220 may crawl a corpus of documents, index the documents, and/or store information associated with the documents in a repository of documents. Crawler/indexer system 220 may be employed as a single entity or as distributed entities.

Network 230 may include, for example, a local area network (LAN), a wide area network (WAN), a telephone network, such as the Public Switched Telephone Network (PSTN) or a cellular network, an intranet, the Internet, and/or a combination of networks. Document hosts 210 and crawler/indexer system 220 may connect to network 230 via wired and/or wireless connections. The connections may either be direct or indirect connections.

Exemplary Crawler/Indexer System Architecture

Figure 3:
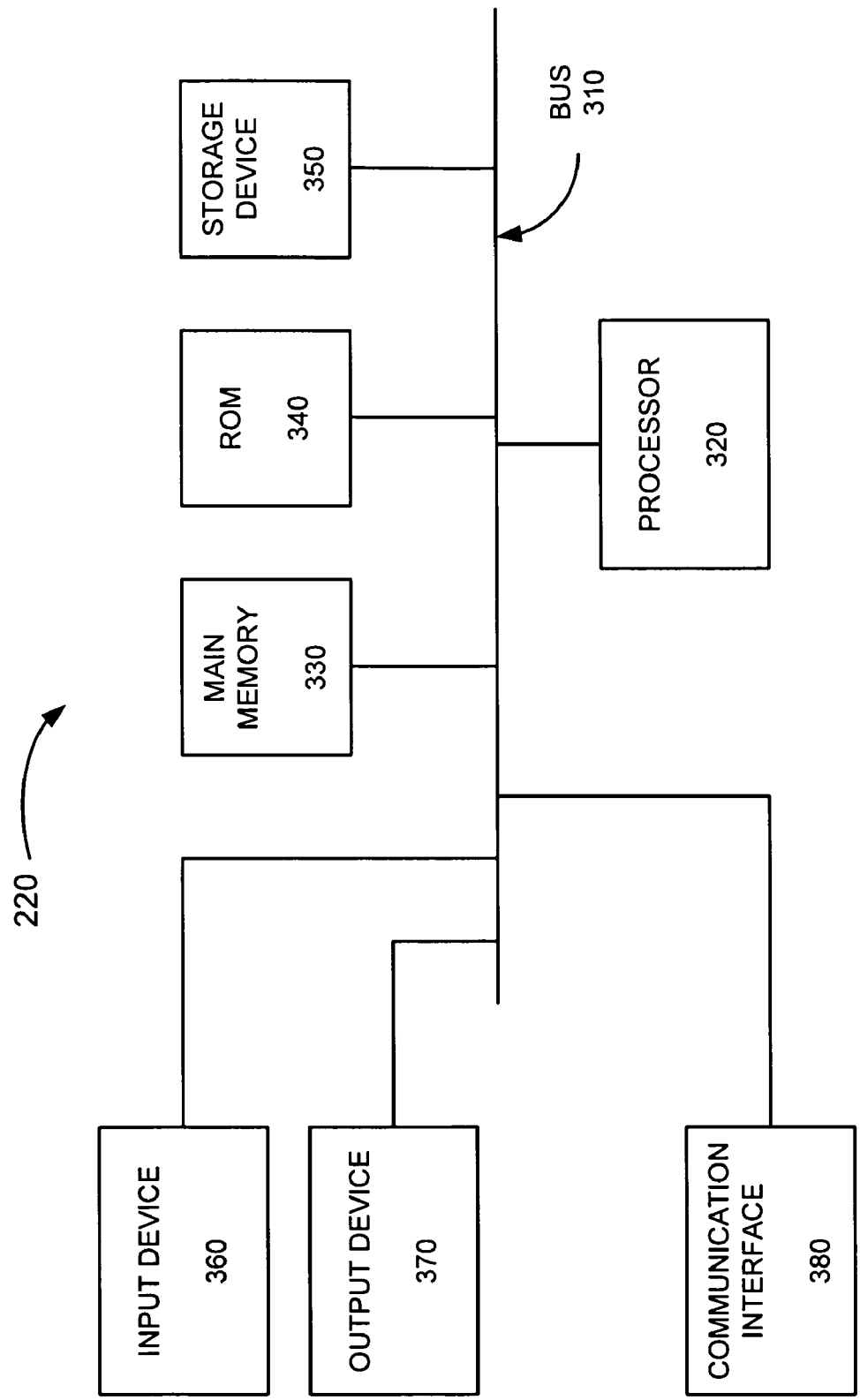
FIG. 3 is a diagram illustrating exemplary components of the crawler/indexer system depicted in FIG. 2.

FIG. 3 is a diagram illustrating exemplary components of crawler/indexer system 200. As illustrated, crawler/indexer system 220 may include a bus 310, a processor 320, a main memory 330, a read only memory (ROM) 340, a storage device 350, an input device 360, an output device 370, and a communication interface 380. The term "component," as used herein, is intended to be broadly interpreted to include software, hardware, or a combination of hardware and software.

Bus 310 may include a path that permits communication among the components of crawler/indexer system 220. Processor 320 may include a processor, microprocessor, or processing logic that may interpret and execute instructions. Main memory 330 may include a random access memory (RAM) or another type of dynamic storage device that may store information and/or instructions for execution by processor 320. ROM 340 may include a ROM device or another type of static storage device that may store static information and/or instructions for execution by processor 320. Storage device 350 may include a magnetic and/or an optical recording medium and its corresponding drive.

Input device 360 may include a component that permits an operator to input information to crawler/indexer system 220, such as a keyboard, a mouse, a pen, voice recognition and/or biometric mechanisms, etc. Output device 370 may include a component that outputs information to an operator, including a display, a printer, a speaker, etc. Communication interface 380 may include any transceiver-like mechanism that enables crawler/indexer system 220 to communicate with other devices and/or systems. For example, communication interface 380 may include components for communicating with another device or system via a network, such as network 230.

Crawler/indexer system 220 may perform certain operations, as will be described in detail below, in response to processor 320 executing software instructions contained in a computer-readable medium, such as memory 330. A computer-readable medium may be defined as a physical or a logical memory device.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes as described herein. Thus, implementations as described herein are not limited to any specific combination of hardware circuitry and software.

Exemplary Crawler/Indexer System Functional Components

Figure 4:
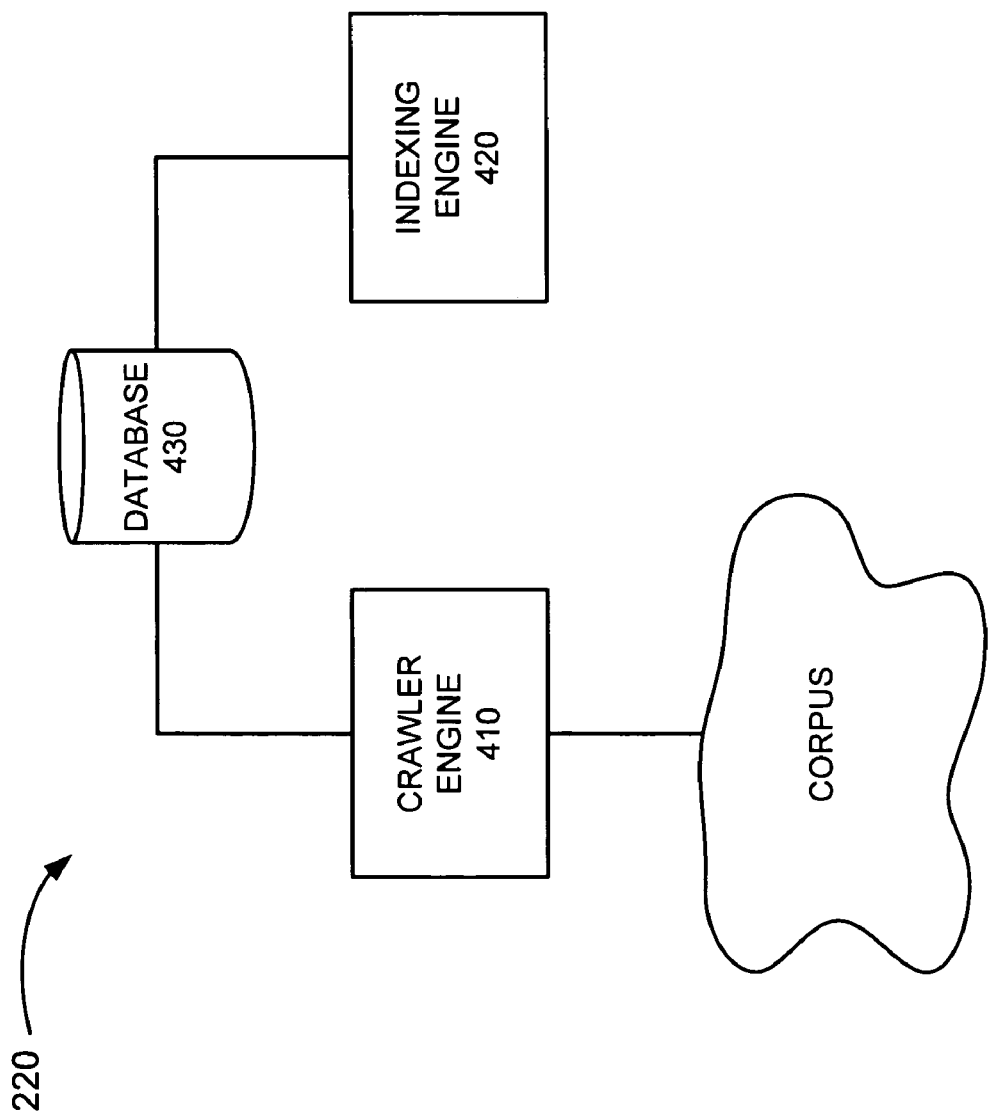
FIG. 4 is a diagram illustrating exemplary functional components of the crawler/indexer system depicted in FIG. 2.

FIG. 4 is a diagram illustrating exemplary functional components of crawler/indexer system 220. As illustrated, crawler/indexer system 220 may include a crawler engine 410, an indexing engine 420 connected to a database 430. While FIG. 4 illustrates these functional components within crawler/indexer system 220, in other implementations, crawler engine 410, indexing engine 420, and/or database 430 may be implemented partially or wholly within another device or a group of devices, including or excluding, crawler/indexer system 220.

Crawler engine 410 may operate from a list of addresses to fetch the corresponding documents from a corpus of documents (e.g., the web). Crawler engine 410 may extract the addresses associated with the outgoing links in the document and add the addresses to the list of addresses to be crawled. Crawler engine 410 may also store information associated with the document, such as all or part of the document, in database 430.

Indexing engine 420 may process documents provided by crawler engine 410. For example, indexing engine 420 may create an index of the documents and store the index in database 430. Indexing engine 420 may form clusters of duplicate documents. Indexing engine 420 may select a representative document from each cluster. In one implementation, indexing engine 420 may utilize previous representative information and whether a document was crawled or not crawled to influence the forming of clusters and the selecting of representatives. As a result, indexing engine 420 may reduce the chance of creating superfluous or unnecessary clusters and, thus, reduce the likelihood that a duplicative document will be indexed and provided as a search result.

Database 430 may be embodied within a single memory device, within multiple (possibly distributed) memory devices, and/or within a single or multiple storage devices. Database 430 may store various types of information, such as a list of addresses used by crawler engine 410, information associated with documents crawled by crawler engine 410, and/or an index generated by indexing engine 420.

Exemplary Crawler Engine Functional Components

Figure 5:
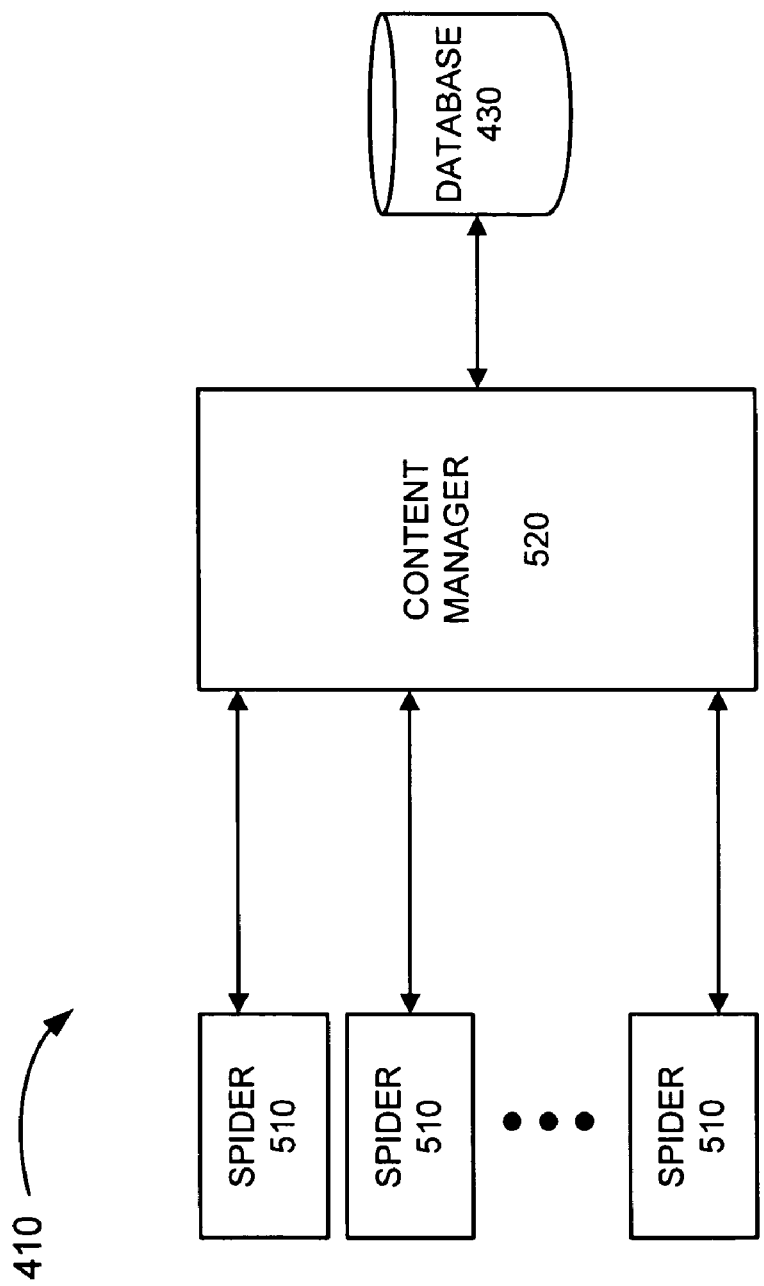
FIG. 5 is a diagram illustrating exemplary functional components of the crawler engine depicted in FIG. 4.

FIG. 5 is a diagram illustrating exemplary functional components of crawler engine 410. As illustrated, crawler engine 410 may include spiders 510 and a content manager 520. While FIG. 5 illustrates these functional components within crawler/indexer system 220, in other implementations, spiders 510 and/or content manager 520 may be implemented partially or wholly within another device or a group of devices, including or excluding, crawler/indexer system 220.

A spider 510 may crawl a document from a corpus of documents and provide the document to a content manager 520. In some instances, spider 510 may refer to, for example, a robots.txt file. Spiders 510 may operate from a list of addresses provided by content manager 520. Spiders 510 may re-visit documents from the corpus for updates or changing information based on re-visit policies (e.g., refresh policies, politeness policies, load on a given host, rate limits, etc.). In this regard, in some instances, documents may be re-visited at different times and/or frequencies.

Content manger 520 may parse a document crawled by a spider 510 to identify outgoing links that the document contains. Content manager 520 may add addresses associated with the outgoing links to a list of addresses that it maintains. Content manger 520 may provide addresses from the list to spiders 510 as instructions for spiders 510 to crawl the corresponding documents. Content manager 520 may also store information associated with the documents (e.g., all or a part of the documents), including quality information, in database 430.

Exemplary Indexing Engine Functional Components

Figure 6:
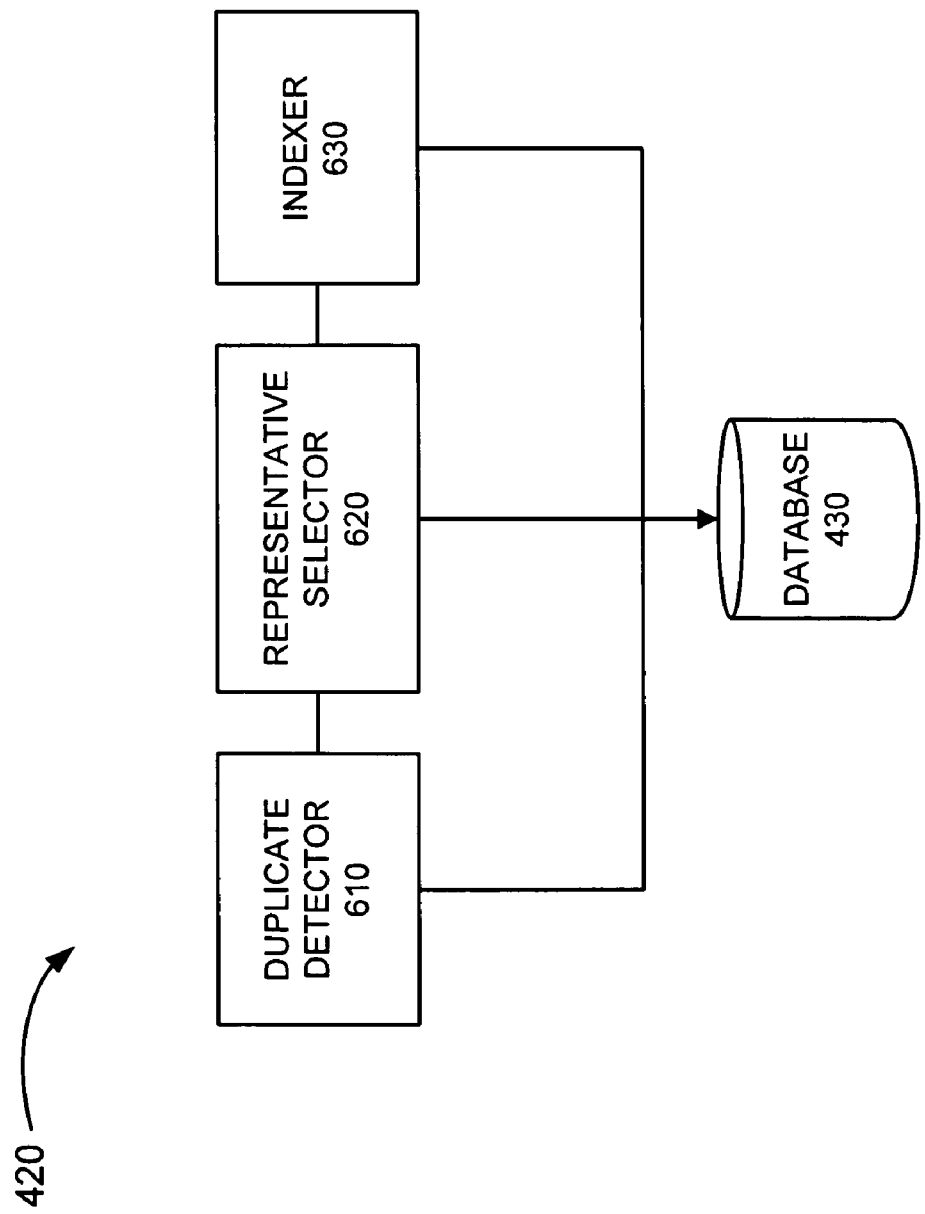
FIG. 6 is a diagram illustrating exemplary functional components of the indexing engine depicted in FIG. 4.

FIG. 6 is a diagram illustrating exemplary functional components of indexing engine 420. As illustrated, indexing engine 420 may include a duplicate detector 610, a representative selector 620, and an indexer 630. While FIG. 6 illustrates these functional components within crawler/indexer system 220, in other implementations, duplicate detector 610, representative selector 620, and/or indexer 630 may be implemented partially or wholly within another device or a group of devices, including or excluding, crawler/indexer system 220.

Duplicate detector 610 may include one or more clustering algorithms or decision processes for determining whether two documents are duplicates (including substantial duplicates) of each other. These clustering algorithms or decision processes may employ one or more criteria to cluster (i.e., group) documents. In general, the criteria for determining duplicate documents may include content-based clustering and/or predictive clustering.

Content-based clustering may require analysis of the contents of the documents. For example, duplicator detector 610 may compute a checksum or a hash over the content or a portion of the content of the document. In this instance, two documents that share the same checksum value (or checksum ID) may be considered duplicates of each other.

Another example of a content-based clustering may involve analyzing redirect information. Redirection is a technique for making a document available under more than one address (e.g., URL). Generally, a redirect causes a browser to change from a source address to a target address. There are many types of redirects. For example, there are manual redirects, status code redirects (e.g., Hypertext Transfer Protocol (HTTP) status codes 301 or 302), meta refresh redirects, or JavaScript redirects. If a source document redirects to a target document, then the source document and the target document may be considered duplicates of each other, and may be associated with a same identifier (e.g., a target ID). In many cases, a target document may have multiple sources.

In one implementation, the target document may correspond to a final target document. That is, a concatenation of redirects may include an intermediary target document, which may not constitute a final target document. Conversely, a document may not be associated with a source document and may not be considered a (final) target document. Rather, in such instances, the document may be considered a content document. Thus, a final target document and a content document may be distinguished based on a presence or an absence of a source document.

Predictive-based clustering may identify duplicate documents without analyzing the contents of the documents. For example, predictive-based clustering may involve computing checksums or hashes over documents of a web site, a directory, a subdirectory, or a combination of address parameters, and generating a set of rules that given an address, assigns a predictive identifier (ID) for the document associated with the address. The predictive ID may then be utilized to determine whether two documents are duplicates. Additionally, or alternatively, other sets of rules may be generated for a web site, a directory, a sub-directory, or an address parameter combination. In some cases, these rules may include a list of address prefixes that have been determined as being equivalents of each other. An example of this may include a rule that specifies that www.mysite.com and www.planetearth.com/mysite are equivalents of each other. Thus, address pairs such as www.mysite.com/document and www.planetearth.com/mysite/document, or www.mysite.com/index and www.planetearth.com/mysite/index, etc., may be mapped to the same predictive ID, respectively.

In other instances, the rules may specify that a portion of an address is unimportant, and may be ignored for considering whether two addresses are equivalent. For example, a rule may specify that a session identifier within an address does not matter. In this case, for example, the rule may consider the addresses www.forum.com/posts?postid=110&sid=165 and www.forum.com/posts?postid=110&sid=166 to be associated with duplicate documents. In another case, for example, the rule may consider the addresses www.forum.com/posts/postid=110/sid=165 and www.forum.com/posts/postid=110/sid=166 to be associated with duplicate documents. Thus, duplicate detector 610 may assign each document with the same predictive ID.

Depending on the key generated (e.g., checksum ID, predictive ID, or target ID) for a document, duplicate detector 610 may determine whether the document belongs to an existing cluster or forms a new cluster. Thus, a cluster may include one document, thousands of documents, or millions of documents, sharing the same key. Duplicate detector 610 may store information regarding a cluster to which a document belongs in, for example, database 430. As will be described in detail below, the information may include whether the document was re-crawled.

Representative selector 620 may process each cluster in a set of clusters to select a representative document. For example, representative selector 620 may rank the documents in a cluster in some manner to create a ranked list. In one implementation, representative selector 620 may utilize information that reflects a measure of quality of the documents to rank the documents. For example, representative selector 620 may utilize quality information as a measure of quality and/or some other type of information as a measure of quality. Representative selector 620 may store information associated with representatives in, for example, database 430. The information stored may include quality information.

Indexer 630 may index one or more top-ranked documents from each of the ranked lists. For example, indexer 630 may take the text or other data of a top-ranked document in a ranked list, extract individual terms or other data from the text of the document, and sort those terms or other data (e.g., alphabetically) in an index. Other techniques for extracting and indexing content, that are more than simple word-level indexing, may also or alternatively be used, including techniques for indexing Extensible Markup Language (XML) data, images, videos, etc. Each entity in the index may contain a term or other data stored in association with a list of documents in which the term or other data appears and the location within the document where the term or other data appears.

Exemplary Process of Determining Clusters and Representatives

Figure 7:
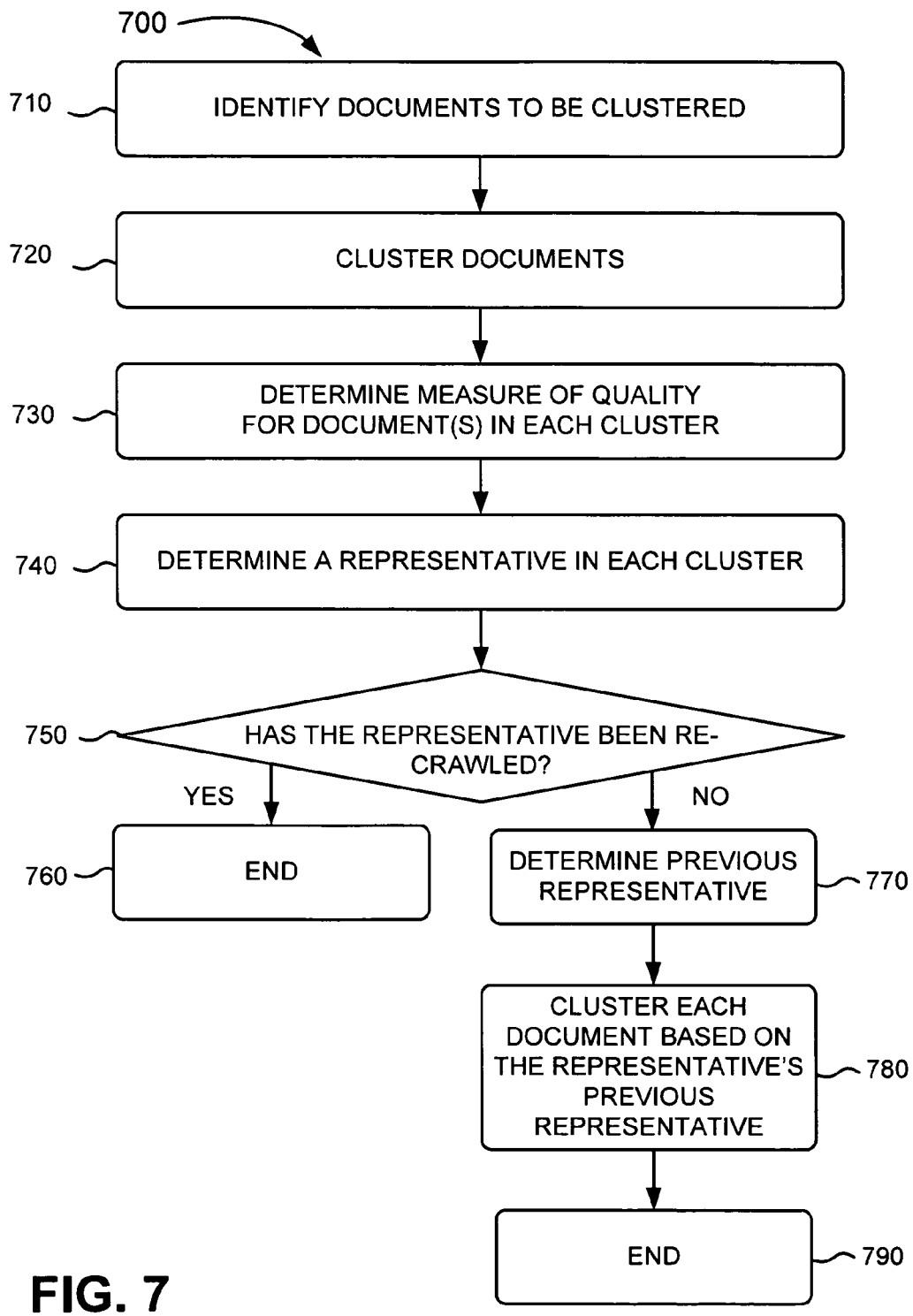
FIG. 7 is a diagram illustrating an exemplary process for determining clusters and representatives.

FIG. 7 is a flowchart illustrating an exemplary process 700 for determining clusters and representatives. In one implementation, process 700 may be performed by indexing engine 420. In other implementations, process 700 may be performed wholly or partially by one or more other components, including or excluding, indexing engine 420.

Process 700 will be described as having an initial state where a previous clustering and selection of representatives associated with documents already occurred, and that the clustering information and the representative information was stored in, for example, database 430.

Figure 8:
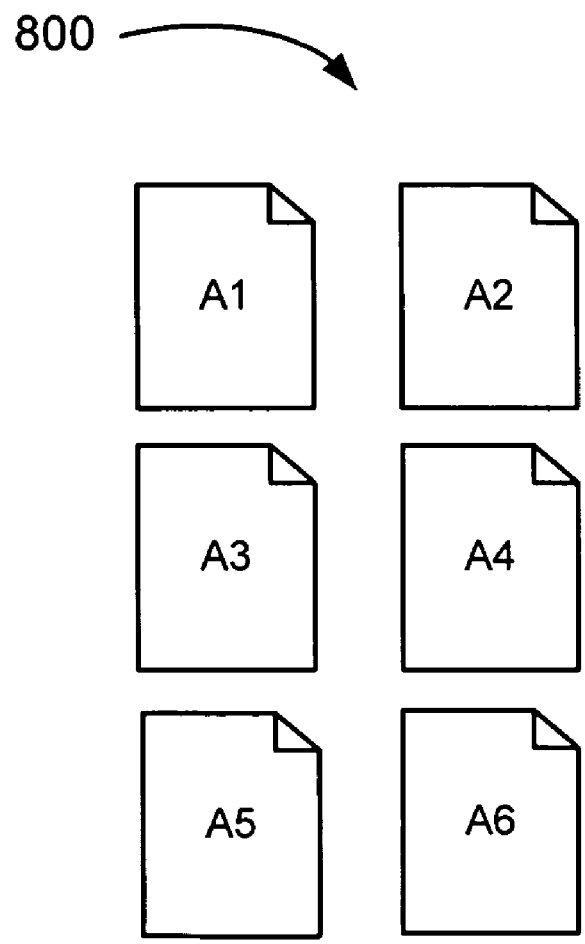
FIG. 8 is a diagram illustrating an exemplary set of documents to be clustered.

As illustrated, process 700 may begin with identifying documents to be clustered (block 710). For example, indexing engine 420 may refresh index information stored in a repository (e.g., database 430) based on refresh policies. In one implementation, the refresh policies may be different (e.g., in terms of time and/or frequency) for some documents compared to other documents in database 430. In such an instance, indexing engine 420 may identify documents to be clustered. Additionally, or alternatively, indexing engine 420 may identify documents to be clustered based on a previous clustering process and/or selection of representative process. For discussion and illustration purposes, consider that documents 800 (A1, A2, . . . , A6) correspond to a subset of the identified documents to be clustered, as illustrated in FIG. 8.

Figures 9A, 9B:
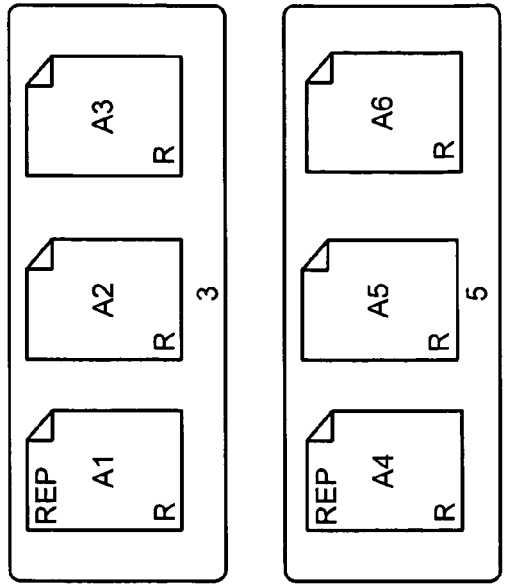

Additionally, for discussion and illustration purposes, FIGS. 9A and 9B illustrate exemplary index information associated with identified documents 800. For example, FIG. 9A illustrates an indexing table 905 that may include a document field 910; a key value field 915; a re-crawled field 920; and a representative ("rep") field 925.

Document field 910 may provide a name and/or an address (e.g., a URL) of a document. Key value field 915 may provide a document identifier (e.g., a string), corresponding to the document identified in document field 910, based on, for example, a clustering process. Re-crawled field 920 may indicate whether the document, identified in document field 910, was re-crawled. Rep field 925 may indicate the representative document associated with the document identified in document field 910. Since this index information may have been associated with documents 800 before block 710, this index information relates to previous decisions by indexing engine 420. Additionally, since the index information is exemplary, in practice, the index information may be different. Additionally, or alternatively, in other implementations, the index information may include additional or less data than the data depicted in FIG. 9A. For example, re-crawled field 920 may include timestamp information.

FIG. 9B illustrates an alternative representation of the information provided in FIG. 9A. That is, documents (A1, A2, and A3) were clustered together having shared the same key value field 915 (i.e., "3"), with document (A1) having been selected as the representative (as illustrated by a "REP"), and documents (A4, A5, and A6) were clustered together having shared the same key value field 915 (i.e., "5"), with document (A4) having been selected as the representative. Additionally, all of the documents 800 were re-crawled (as illustrated by an "R").

Returning to FIG. 7, the documents may be clustered (block 720). In one implementation, duplicate detector 610 may cluster documents 800 based on a content-based clustering technique. For example, duplicate detector 610 may determine a checksum ID or a target ID for each document of documents 800. In another implementation, duplicate detector 610 may cluster documents 800 based on a predictive-based clustering technique. For example, duplicator detector 610 may determine a predictive ID. In still other implementations, duplicate detector 610 may cluster documents 800 based on a combination of a content-based clustering technique and a predictive-based clustering technique, and/or some other type of clustering technique not specifically mentioned herein.

Referring to FIG. 9C, exemplary index information after block 720 is illustrated. For example, indexing table 905 may include information regarding previous decisions and information regarding current decisions. The previous decisions information corresponds to the information presented in FIG. 9A. The current decisions information may include a re-crawled field 930 and a key value field 935. The re-crawled field 930 may indicate that documents (A1, A3, and A4) were re-crawled, but that documents (A2, A5, and A6) were not re-crawled. Additionally, key value field 935 may indicate that documents that were re-crawled have, for example, new checksum values compared to their previous key value field 915. That is, for example, the documents that were re-crawled may have changed in content and correspondingly may have a different checksum value compared to a previous checksum value. However, the documents that were not re-crawled have, for example, the same checksum values as before, as indicated by a comparison of key value field 915 and key value field 935. Since this index information is being generated as process 700 operates, this information is labeled as current decisions. It is to be understood, however, that the mere operation of re-crawling a document does not necessarily mean that key value field 935 will change. In other words, a document's content may not change from one crawling operation to the next. In this case, the document's key value may stay the same.

Returning to FIG. 7, a measure of quality may be determined for document(s) in each cluster (block 730). In one implementation, a measure of quality (also referred to herein as a quality score) for each document may be determined. The measure of quality for a document may be based on quality information. For example, representative selector 620 may determine a quality score for each document in a cluster based on, for example, quality information associated with documents 800 (A1, A2, ..., A6). As previously described, quality information may include link information, a date a document is created, a page (or document) rank, anchor text information, an aesthetic of address information (e.g., a short and/or a word-based URL may have a higher aesthetic value than a long and/or a non-word based URL containing, for example, symbols, such as ?, !, ~, *, etc.), popularity information, source of content information (e.g., quality of web site, age of web site), and/or other kinds of information that may indicate whether a document may be a good representative.

A representative for each cluster may be determined (block 740). For example, representative selector 620 may determine the representative for each cluster based on the measure of quality associated with each document. In one implementation, representative selector 620 may select the representative for each cluster based on a measure of quality associated with the document. Additionally, or alternatively, representative selector 620 may select a document having the highest measure of quality in a cluster as the representative document of the cluster.

FIG. 9D illustrates exemplary indexing information in indexing table 905. As illustrated, indexing table 905 may include representative ("rep") field 940. Rep field 940 may indicate the representatives determined in block 740. As illustrated, documents (A1, A2, A4, and A5) may be selected as representatives.

Whether the representative has been re-crawled may be determined (block 750). For example, indexing engine 420 (e.g., duplicator detector 610 or representative selector 620) may determine which representatives were re-crawled and which representatives were not re-crawled since a prior clustering process by referring to indexing table 905. If it is determined that each representative has been re-crawled (block 750—YES), then process 700 may end (block 760).

On the other hand, if it is determined that a representative has not been re-crawled (block 750—NO), then indexing engine 420 may determine the previous representative associated with the representative that was not re-crawled (block 770). For example, indexing engine 420 may refer to rep field 925 for documents (A2 and A5). In this example, indexing engine 420 may determine that the previous representative associated with document (A2) is document (A1), and that the previous representative associated with document (A5) is document (A4).

Each document associated with the representative not re-crawled may be clustered based on the representative's previous representative (block 780). For example, based on the representative's previous representatives, document (A2) may be clustered (or assigned) with documents (A1 and A3), and documents (A5 and A6) may be clustered (or assigned) with document (A4). FIG. 9E is a diagram illustrating the exemplary index information in indexing table 905 corresponding to this decision process. As illustrated, documents (A2, A5, and A6) were clustered to a different cluster. Additionally, key value 935 associated with documents (A2, A5, and A6) may be modified. For example, key value 935 associated with documents (A2, A5, and A6) may be modified to a value indicative of the different cluster. Additionally, or alternatively, various types of information may be stored regarding the clusters and/or the associated documents.

Returning to FIG. 7, while process 700 may end at block 760 and block 790, additional operations may be performed by crawler/indexer system 220 before and/or after process 700. For example, after (block 780), a representative may be selected from the clusters that were re-clustered. In other words, for example, a representative may be selected from the cluster including documents (A1, A2, and A3). Additionally, or alternatively, in one implementation, indexing engine 420 (e.g., indexer 630) may take the text or other data of the representative document, extract individual terms or other data from the text of the representative document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears.

It will be appreciated that process 700 may be modified to attain an identical or similar result. For example, block (750) may be altered to determine which documents have not been re-crawled. Block (770) may include determining the previous representative for each of the documents not re-crawled (whether or not those documents are representatives), and block (780) may include clustering each document not re-crawled based on its previous representative. Other modifications, not explicitly described herein, may be implemented. However, regardless of the specific implementation, it will be appreciated that documents that have not been re-crawled may be assigned to a cluster based on previous representative information.

Additionally, it will be appreciated that a clustering process and/or a canonical process relating to a collection of documents, including or excluding documents 800, may precede process 700. Additionally, or alternatively, it will be appreciated that a clustering process and/or a canonical process relating to a collection of documents, including or excluding documents 800, may succeed process 700. In one implementation, a clustering process preceding and/or succeeding process 700 may utilize a different type of clustering than the type of clustering utilized during process 700. For example, if process 700 utilizes a content-based clustering technique, then a clustering process preceding and/or succeeding process 700 may utilize a predictive-based clustering technique. In other implementations, the clustering techniques preceding and/or succeeding process 700 may utilize a clustering process identical to a clustering process performed during process 700, or similar thereto (e.g., a content-based clustering technique (checksum ID) during process 700 and a content-based clustering technique (target ID) preceding and/or succeeding process 700). It will be appreciated that the terms "preceding" and "succeeding," as used herein, are intended to be broadly interpreted to not only include immediately preceding or immediately succeeding, but also more distant successors and more distant predecessors.

CONCLUSION

Implementations described herein may facilitate the clustering of duplicative documents that have not been re-crawled since a prior clustering process.

The foregoing description provides illustration and description, but is not intended to be exhaustive or to limit the invention to the precise form disclosed. Modifications and variations are possible in light of the above teachings or may be acquired from practice of the teachings. For example, while the notion of whether a document was re-crawled has been described, in other implementations, other processing mechanisms may be considered.

In addition, while a series of blocks has been described with regard to FIG. 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" or "an" is intended to include one or more items. Where only one item is intended, the term "one" or similar language is used. Further, the phrase "based on" is intended to mean "based, at least in part, on" unless explicitly stated otherwise.

The term "may" is used throughout this application and is intended to be interpreted as "having the potential to," or "being able to," and not in a mandatory sense (e.g., as "must"). The term "and/or" is intended to be interpreted to include any and all combinations of one or more of the associated list items.

What is claimed is:

1. An automated method, comprising:
   identifying documents in a current clustering operation;
   assigning the identified documents to one or more clusters;
   selecting a current representative document for each of the one or more clusters;
   determining whether the current representative document has been re-crawled;
   determining a previous representative document with which the current representative document was previously associated in a prior clustering operation, if it is determined that the current representative document has not been re-crawled;
   determining one of the one or more clusters to which the previous representative document has been assigned in the current clustering operation;
   combining one of the one or more clusters associated with the current representative document that has not been re-crawled with the one of the one or more clusters associated with the previous representative document into a combined cluster; and
   storing information regarding the combined cluster.

2. The automated method of claim 1, further comprising:
   selecting the previous representative document in the prior clustering operation; and
   storing information identifying the previous representative document.

3. The automated method of claim 1, further comprising:
   indexing one of the identified documents associated with the combined cluster.

4. The automated method of claim 1, where assigning the identified documents to the one or more clusters includes:
   assigning the identified documents to the one or more clusters based on a content-based clustering technique.

5. The automated method of claim 1, further comprising:
   storing information indicating whether the current representative document has been re-crawled.

6. The automated method of claim 1, further comprising:
   generating a checksum value for each of the identified documents; and
   utilizing the checksum value to assign each of the identified documents to the one or more clusters.

7. The automated method of claim 1, further comprising:
   re-crawling a subset of the identified documents between the prior clustering operation and the current clustering operation.

8. The automated method of claim 1, further comprising:
   generating a measure of quality for each of the identified documents; and
   selecting the current representative document for each of the one or more clusters based on the measure of quality.

9. A system, comprising:
   at least one memory; and
   at least one processor, connected to the at least one memory, to:
      store re-crawl information indicating which document of a plurality of documents has been re-crawled,
      assign the documents to one or more clusters in a current clustering operation,
      select a current representative document for each of the one or more clusters,
      determine whether the current representative document has been re-crawled based on the re-crawl information,
      determine a previous representative document associated with the current representative document, if it is determined that the current representative document has not been re-crawled,
      combine together one of the one or more clusters associated with the current representative document that has not been re-crawled and one of the one or more clusters to which the previous representative document has been assigned in the current clustering operation, and
      store information related to each of the one or more clusters.

10. The system of claim 9, where the at least one processor is further configured to:
    re-cluster the one or more clusters in a subsequent clustering operation.

11. The system of claim 9, where when selecting the current representative document for each of the one or more clusters, the at least one processor is configured to:
    generate a measure of quality for each document in the one or more clusters based on quality information that includes at least one of link information, a date each document was created, a page rank, anchor text information, an aesthetic value associated with an address of each document, popularity information associated with each document, or source of content information associated with each document.

12. The system of claim 9, where the re-crawl information includes timestamp information.

13. The system of claim 9, where the one of the one or more clusters associated with the current representative document that has not been re-crawled includes another document in addition to the current representative document.

14. The system of claim 9, where when assigning the documents to the one or more clusters in the current clustering operation, the at least one processor is configured to:
   assign each of the documents to the one or more clusters based on a key value generated during the current clustering operation.

15. The system of claim 14, where the key value is based on a predictive-based clustering operation.

16. A system, comprising:
   at least one computer-readable medium containing computer-executable instructions, the at least one computer-readable medium comprising:
   one or more instructions for clustering documents into one or more clusters in a current clustering process;
   one or more instructions for selecting a representative for each of the one or more clusters;
   one or more instructions for determining if the representative has been re-crawled since a prior clustering process;
   one or more instructions for determining a previous representative associated with the representative in the prior clustering process, if it is determined that the representative has not been re-crawled;
   one or more instructions for forming a combined cluster that includes one of the one or more clusters associated with the representative that has not been re-crawled and one of the one or more clusters to which the previous representative has been assigned in the current clustering process; and
   one or more instructions for storing information related to the combined cluster.

17. The system of claim 16, where the at least one computer-readable medium further comprises:
   one or more instructions for selecting a representative for the combined cluster.

18. The system of claim 16, where the at least one computer-readable medium further comprises:
   one or more instructions for re-clustering, if it is determined that the representative has been re-crawled.

19. The system of claim 16, where the one or more instructions for selecting the representative comprises:
   one or more instructions for selecting the representative for each of the one or more clusters based on a measure of quality associated with each of the documents.

20. A system, comprising:
   means for clustering documents into one or more clusters in a current clustering operation;
   means for assigning a measure of quality to each of the documents of the one or more clusters;
   means for selecting a current representative document for each of the one or more clusters based on the measure of quality;
   means for determining whether the current representative document has been re-crawled;
   means for determining a previous representative document associated with the current representative document, if it is determined that the current representative document has not been re-crawled;
   means for assigning one of the one or more clusters that includes the current representative document that has not been re-crawled to a same cluster of the one or more clusters to which the previous representative document has been assigned in the current clustering operation; and
   means for storing information related to the one or more clusters.

21. The system of claim 20, further comprising:
   means for selecting a subsequent representative document for each of the one or more clusters.

\* \* \* \* \*